Aug. 11, 1970  R. B. BUSWELL  3,523,307

APPARATUS FOR PRODUCING A MOVING FLUID SURFACE

Filed Nov. 24, 1967

RICHARD BOBART BUSWELL

*Inventor*

By Wendroth,
and Ponack  Attor

United States Patent Office 3,523,307
Patented Aug. 11, 1970

3,523,307
APPARATUS FOR PRODUCING A MOVING FLUID SURFACE
Richard Bobart Buswell, 214 Greys Road, Henley-on-Thames, Oxfordshire, England
Filed Nov. 24, 1967, Ser. No. 685,514
Claims priority, application Great Britain, Dec. 2, 1966, 53,991/66; May 19, 1967, 23,362/67
Int. Cl. E04h 3/16
U.S. Cl. 4—172                                    7 Claims

ABSTRACT OF THE DISCLOSURE

An apparatus for producing a moving fluid surface and particularly a water surface for training water skiers. A tank for the fluid has an outflow at one end protected by a grill and communicating by ducts leading to a header space from which the fluid is pumped to a spray box below the fluid contained in the tank and a distributor pipe at the fluid surface. Streams from the spray box are directed upwardly and streams from the distributor pipe flow horizontally towards the outflow. In combination the upward and horizontal streams form a support for a stationary water skier holding a tow rope attached to a fixed anchorage.

---

This invention relates to apparatus for producing a moving fluid surface.

With the increasing popularity of water skiing there is a need for indoor training facilities which can be employed to teach at least the basic methods of this sport, regardless of weather conditions or the time of year or day, and the primary object of the present invention is to provide apparatus which is capable of producing a fast moving water surface under a stationary water skier to simulate actual water skiing conditions in which, of course, a fast moving skier is towed over stationary or at most relatively slow moving water.

In accordance with the invention, apparatus for producing a moving fluid surface comprises a tank, pumping means to extract fluid from one part of the tank and deliver it to orifices to produce a flow of fluid towards the fluid surface in the tank and horizontally along the fluid surface towards the said part of the tank.

Figure 1:
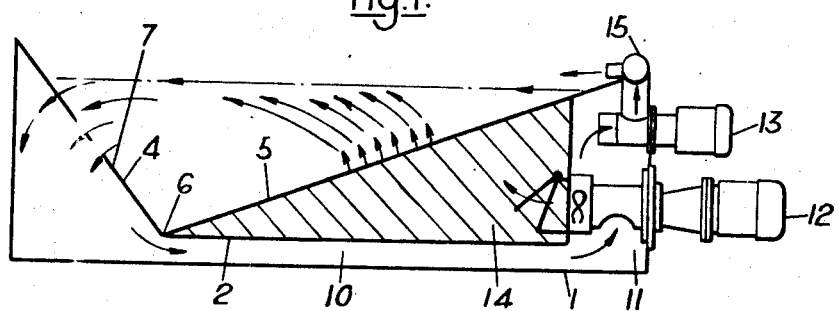
Figure 2:
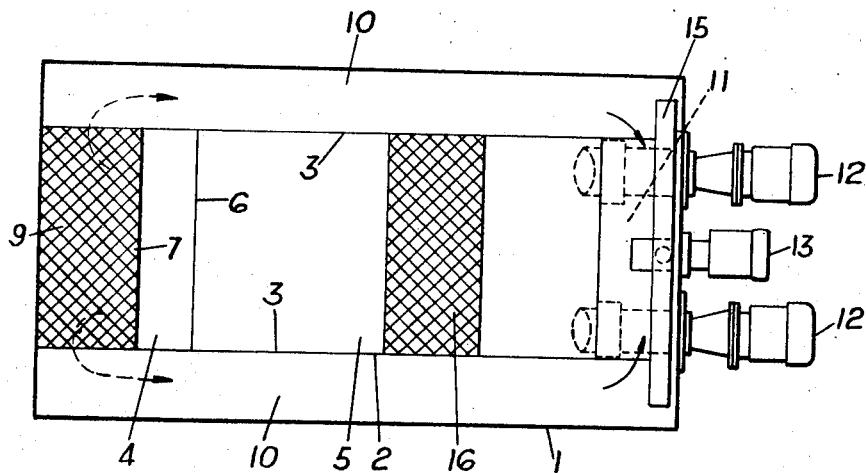

For a fuller understanding of the invention, a preferred embodiment will now be described with reference to the accompanying drawings, wherein:

FIG. 1 shows a diagrammatic sectional elevation of a tank according to the invention for training water skiers; and FIG. 2 shows a plan view of the tank.

The tank, as shown, has an outer casing 1 of generally rectangular shape enclosing an inner container 2 of prismatic shape having substantially vertical side walls 3 and two bottom walls 4, 5 meeting at a line 6 across the tank nearer one end than the other. The upper edge 7 of the wall 4 is some distance below the top edges of the side walls to form a weir, above which is located a grill 9. Water in the container 2 flowing over the weir and enters a return passage 10 which leads to a header chamber 11 at the opposite end of the tank to the weir. Electrically driven feed-pumps 12, 13 draw water from the header chamber and deliver it to a spray box 14, which is located below the wall 5 and contains an array of outlets 16 extending through the wall 5 to direct a stream of water into the container 2 in a generally upward direction and to a distribution pipe 15. Nozzles spaced along the distributor pipe 15 direct water streams substantially horizontally towards the outfall grill 9.

In use the tank is filled with water to a level approximately that of the distributor pipe, as shown. When the pumps 12, 13 are set in motion, water is drawn off the inner container over the weir and through the outfall grill and replenished through the outlets 16 and the distributor pipe 15. The upward and horizontal streams thereby produced form a moving water surface capable of supporting a water skier. The upward streams cause a reduction in the rate of horizontal movement which would be otherwise necessary to stop a skier sinking, so that a skier who falls is carried towards the grill at a speed sufficiently low for safety. In order to maintain a stationary position, and be thereby in motion relative to the moving water surface, the skier holds on to a conventional tow rope which has its other end secured to a fixed anchorage at or beyond the end of the tank from which the water flows in the container.

The pumps 12, 13 may be of any convenient form for example rotary pumps or screw propellors driven by electric motors.

In the event of a skier falling it is necessary to stop the water flow promptly and this may be accomplished by stopping the pumps or opening bypass valves in the flow circuit to return water from the spray box and distributor pipe directly to the header chamber.

Although the embodiment described above employs water as the working fluid, it is to be understood that other fluids may be used in the practice of the invention including mixtures of fluids, e.g. water having air entrained in it.

What is claimed is:

1. Apparatus for producing a moving fluid surface comprising an open-topped tank having a partition wall with orifices, pumping means to fill said tank to a predetermined level, said pumping means being in a fluid recirculatory system to extract fluid from one part of the tank and deliver it to said orifices to produce a flow of fluid towards the surface of the fluid in said tank and horizontally parallel along the fluid surface towards said one part of said tank.

2. Apparatus according to claim 1, wherein said orifices to provide the flow towards the fluid surface are located in an inclined portion of said partition wall.

3. Apparatus according to claim 1, wherein a distributor pipe having orifices produces a flow horizontally along the fluid surface in said tank.

4. Apparatus according to claim 1 wherein said pumping means comprises a header chamber within said tank and a pump to deliver fluid from said header chamber to said orifices.

5. Apparatus according to claim 4, wherein said header chamber is connected by ducts to a weir forming a fluid outlet from said one part of said tank.

6. Apparatus according to claim 5, wherein a grill is provided above said weir.

7. Apparatus according to claim 1, wherein said fluid is water.

References Cited
UNITED STATES PATENTS

| | | | |
|---|---|---|---|
| 490,484 | 1/1893 | Mackaye | 4—172 XR |
| 586,718 | 7/1897 | Wharton | 4—172 XR |
| 2,815,951 | 12/1957 | Baldanza | 272—17 XR |

FOREIGN PATENTS

| | | |
|---|---|---|
| 1,090,262 | 11/1967 | Great Britain. |
| 1,118,083 | 6/1968 | Great Britain. |

LAVERNE D. GEIGER, Primary Examiner
H. K. ARTIS, Assistant Examiner

U.S. Cl. X.R.
272—16